United States Patent
Dong (10) Patent No.: US 12,309,633 B2
(45) Date of Patent: May 20, 2025

(54) APPARATUS AND METHOD FOR SENDING AND RECEIVING BUFFER DATA INFORMATION

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/261,046

(22) PCT Filed: Jan. 12, 2021

(86) PCT No.: PCT/CN2021/071230
§ 371 (c)(1),
(2) Date: Jul. 11, 2023

(87) PCT Pub. No.: WO2022/150957
PCT Pub. Date: Jul. 21, 2022

(65) Prior Publication Data
US 2024/0064561 A1    Feb. 22, 2024

(51) Int. Cl.
*H04W 28/02* (2009.01)
*H04W 24/10* (2009.01)
*H04W 72/21* (2023.01)

(52) U.S. Cl.
CPC ....... *H04W 28/0278* (2013.01); *H04W 24/10* (2013.01); *H04W 72/21* (2023.01)

(58) Field of Classification Search
CPC .................................. H04W 28/0278

USPC .......................................................... 375/295
See application file for complete search history.

(56) References Cited

U.S. PATENT DOCUMENTS

| | | | |
|---|---|---|---|
| 2017/0111818 A1 | 4/2017 | Sebire et al. | |
| 2020/0019208 A1* | 1/2020 | You | H04L 7/02 |
| 2020/0236658 A1 | 7/2020 | Toeda et al. | |
| 2023/0146451 A1* | 5/2023 | Kim | H04W 74/0816 370/318 |

FOREIGN PATENT DOCUMENTS

| | | |
|---|---|---|
| CN | 103973401 A | 8/2014 |
| CN | 104349467 A | 2/2015 |
| CN | 104919741 A | 9/2015 |
| CN | 105191216 A | 12/2015 |
| CN | 110167201 A | 8/2019 |
| CN | 111277300 A | 6/2020 |
| WO | WO 2015/139764 A1 | 9/2015 |

OTHER PUBLICATIONS

International Search Report Issued Aug. 2, 2021, in PCT/CN2021/071230, filed on Jan. 12, 2021, 2 pages.
Office Action dated Jan. 19, 2025, issued in Chinese application No. 202180000229.3, with English translation.

* cited by examiner

*Primary Examiner* — Lihong Yu
(74) *Attorney, Agent, or Firm* — Oblon, McClelland, Maier & Neustadt, L.L.P.

(57) ABSTRACT

A method for sending buffer data information includes: determining an uplink frame in a first link among multiple links, wherein the uplink frame at least includes buffer data information of a link other than the first link among the multiple links; and sending the uplink frame to an access point over the first link.

17 Claims, 7 Drawing Sheets

APPARATUS AND METHOD FOR SENDING AND RECEIVING BUFFER DATA INFORMATION

CROSS REFERENCE TO RELATED APPLICATION

The present disclosure is the U.S. national phase application of International Application No. PCT/CN2021/071230 filed on Jan. 12, 2021, the content of which is incorporated herein by reference in its entirety for all purposes.

BACKGROUND

Technical Field

The present disclosure relates to the field of communication technology, in particular to a method for sending buffer data information, a method for receiving buffer data information, an apparatus for sending buffer data information, an apparatus for receiving buffer data information, an electronic device, and a non-transitory computer-readable storage medium.

Description of the Related Art

There can be multiple links between a station (STA) and an access point (AP). For a non-simultaneously transmit (TX) and receive (RX) (Non-STR) station with multiple links, when performing uplink transmission over one link, the uplink transmission over other links cannot be performed, and channel sensing would also not be performed over other links.

SUMMARY

Embodiments of the present disclosure provide a method for sending buffer data information, a method for receiving buffer data information, an apparatus for sending buffer data information, an apparatus for receiving buffer data information, an electronic device, and a non-transitory computer-readable storage medium.

According to a first aspect of embodiments of the present disclosure, a method for sending buffer data information is provided. The method is applied to a station having multiple links with an access point, and includes determining an uplink frame in a first link among the multiple links, wherein the uplink frame at least includes buffer data information of a link other than the first link among the multiple links, and sending the uplink frame to the access point over the first link.

According to a second aspect of embodiments of the present disclosure, a method for receiving buffer data information is provided. The method is applied to an access point having multiple links with a station, and includes receiving an uplink frame over a first link among the multiple links, wherein the uplink frame at least includes buffer data information of a link other than the first link among the multiple links.

According to a third aspect of embodiments of the present disclosure, an apparatus for sending buffer data information is provided. The apparatus is applied to a station having multiple links with an access point, and includes an uplink determination module configured to determine an uplink frame in a first link among the multiple links, wherein the uplink frame at least includes buffer data information of a link other than the first link among the multiple links, and an uplink sending module configured to send the uplink frame to the access point over the first link.

According to a fourth aspect of embodiments of the present disclosure, an apparatus for receiving buffer data information is provided. The apparatus is applied to an access point having multiple links with a station, and includes: an uplink receiving module configured to receive an uplink frame over a first link among the multiple links, wherein the uplink frame at least includes buffer data information of a link other than the first link among the multiple links.

According to a fifth aspect of embodiments of the present disclosure, an electronic device is provided, and includes a processor and a memory for storing instructions executable by the processor. The processor can be configured to implement aforementioned method for sending buffer data information and/or method for receiving buffer data information.

According to a sixth aspect of embodiments of the present disclosure, a non-transitory computer-readable storage medium is provided, on which a computer program is stored. When the program is executed by a processor, the method for sending buffer data information and/or the method for receiving buffer data information are implemented.

BRIEF DESCRIPTION OF THE DRAWINGS

In order to provide a clearer explanation of technical solutions in embodiments of the present disclosure, the drawings required for the description of the embodiments will be briefly introduced in the following.

DETAILED DESCRIPTION OF THE PREFERRED EMBODIMENTS

Technical solutions in embodiments of the present disclosure will be described clearly and completely in the following in conjunction with the drawings. It is apparent that embodiments described are only a part, not all of the embodiments of the present disclosure. Based on embodiments in the present disclosure, other embodiments obtained by those of ordinary skill in the art all fall within the protection scope of the present disclosure.

In a communication process between a station and an access point, in order to enable the access point to determine how much data to be sent by the station and to configure communication resources for the station, the station can send buffer data information to the access point, and inform the access point through the buffer data information of how much data the station has to send.

For example, for a non-simultaneously TX and RX station with multiple links, as the station is using a first link to communicate with the access point, the station can determine how much data is to be sent over the first link, generate the buffer data information based on the data to be sent, and send the buffer data information to the access point over the first link, so as to inform the access point of how much data is to be sent over the first link.

In such case, the station needs to wait until the communication over the first link is completed before using a second link to communicate with the access point. After the communication over the first link is completed, the station uses the second link, and only when the second link is being used, the buffer data information can be generated based on the data to be sent over the second link. The station then sends the buffer data information of the second link to the access point over the second link.

This allows the station to send the buffer data information to the access point only when the station uses the second link to communicate with the access point. However, once the station uses the second link to communicate with the access point, the access point needs to configure communication resources for the station. As the buffer data information of the second link has not been received, the access point has difficulty in accurately configuring communication resources for the station.

Figure 1:
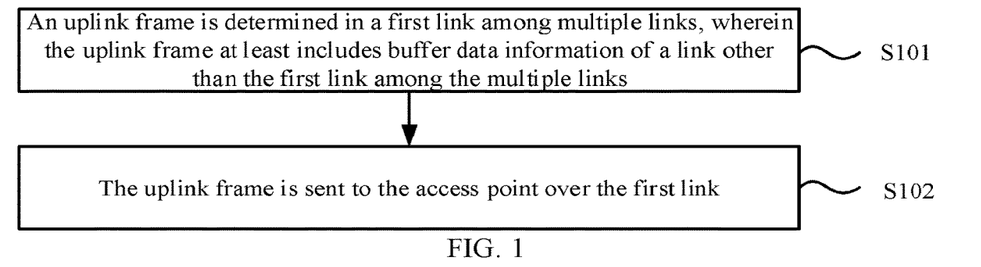
FIG. 1 is a schematic flowchart of a method for sending buffer data information according to embodiments of the present disclosure.

FIG. 1 is a schematic flowchart of a method for sending buffer data information according embodiments of the present disclosure. The method for sending buffer data information in embodiments of the present disclosure can be applied to a station. The station includes but is not limited to electronic devices such as mobile phones, tablets, wearable devices, sensors, IoT (Internet of Things) devices, etc. The station can communicate with an access point. The access point includes but is not limited to electronic devices such as routers, terminals, etc. In some embodiments, the access point can be an access point applicable to the method for receiving buffer data information described in any subsequent embodiment.

In some embodiments, there are multiple links between the station and the access point, and the station can communicate with the access point through one or more of the multiple links.

As shown in FIG. 1, the method for sending buffer data information can include the following steps.

In step S101, an uplink frame is determined in a first link among multiple links, wherein the uplink frame at least includes buffer data information of a link other than the first link among the multiple links.

In step S102, the uplink frame is sent to the access point over the first link.

In some embodiments, the station can determine the uplink frame in the first link, for example, the station generates the uplink frame during communication with the access point using the first link.

In some embodiments, the uplink frame can include buffer data information of a link other than the first link among the multiple links, and the uplink frame can then be sent to the access point over the first link, thereby sending the buffer data information of the link other than the first link in the uplink frame to the access point.

According to embodiments, the access point can receive buffer data information of the link other than the first link during communication with the station over the first link, thereby determining, before communicating with the station over the link other than the first link, how much data is to be sent over the link other than the first link based on the buffer data information received, and thus determining communication resources that need to be allocated to the station for communication over the link other than the first link.

In subsequent communication with the station over the link other than the first link, the communication resources determined can be allocated to the station in a timely manner, thereby avoiding the problem of inaccurate configuration of communication resources for the link other than the first link, due to configuration of communication resources before how much data is to be sent over the link other than the first link has not been determined.

In the related technology, only the buffer data information of the first link can be sent to the access point over the first link. According to embodiments of the present disclosure, the buffer data information of the link other than the first link can be sent to the access point over the first link, thereby expanding the functionality of the first link and improving the utilization of the frequency.

It should be noted that a first link and a link other than the first link mentioned above do not specifically refer to some particular link, but rather to multiple different links. The first link is a link being used for communication between the station and the access point, while the link other than the first link is a link not being used for the communication between the station and the access point. Once the station uses a link other than the first link for communication with the access point, that link other than the first link the station is using for communication can be referred to as a first link, and the first link previously used is referred to as a link other than the first link.

In some embodiments, a first link and a link other than the first link are in a non-simultaneously TX and RX state. That is, when the terminal uses the first link to communicate with the access point, the link other than the first link is in a blindness period or in a power save (PS) state, and the station does not use the link other than the first link to communicate with the access point, nor does the link other than the first link be used for channel sensing.

In such case, the station cannot use the link other than the first link to communicate with the access point when using the first link for communication. Therefore, embodiments of the present disclosure can be applied to the first link and the link other than the first link that are in the non-simultaneously TX and RX state.

In some embodiments, embodiments of the present disclosure can also be applicable when the first link and the link other than the first link transition from the non-simultaneously TX and RX state to a simultaneously TX and RX state, that is, from Non-STR to STR. Although it is possible to communicate simultaneously over the first link and the link other than the first link after transition, embodiments of the present disclosure still can be used to send the buffer data information of the link other than the first link over the first link before, during, or after the transition, due to inability to communicate over the link other than the first link during the communication process using the first link before the transition.

In some embodiments, the buffer data information is located in a Medium Access Control (MAC) frame header of the uplink frame, for example, in an A-control field of the MAC frame header.

In some embodiments, the buffer data information includes an identification of each link other than the first link and information corresponding to an amount of data to be sent over each link other than the first link.

By carrying in the buffer data information the identification of the link other than the first link and information corresponding to the amount of data to be sent over the link other than the first link, the access point can determine based on the identification which identification the buffer data information is for, and determine an amount of data to be sent over the link other than the first link based on the information corresponding to the amount of data to be sent over the link other than the first link, thereby configuring appropriate communication resources for the link other than the first link.

For example, a station uses the first link to communicate with the access point and there are at least two links other than the first link, identifications of which are respectively LinkID2 and LinkID3 The information corresponding to the amount of data to be sent over the link LinkD2 is buffer size2, and the information corresponding to the amount of data to be sent over the link LinkID3 is buffer size3. Then the buffer data information can be as shown in Table 1:

TABLE 1

| LinkID2 | buffer size2 | LinkID3 | buffer size3 | . . . |

Based on the buffer data information, the access point can determine that the information corresponding to the amount of data to be sent over the link LinkD2 is buffer size2, thereby determining an amount of data to be sent over the link LinkD2 based on buffer size2, and thus determining a communication resource allocated to the link LinkID2 based on the amount of data to be sent over the link LinkID2 After the station completes communication using the first link, and when the station uses the link LinkID2 for communication, the communication resource determined can be allocated to the link LinkID2 for the station to use to communicate with the access point over the link LinkID2.

Correspondingly, based on the buffer data information, the access point can also determine that the information corresponding to the amount of data to be sent over the link LinkID3 is buffer size3, thereby determining an amount of data to be sent over the link LinkD3 based on buffer size3, and thus determining a communication resource allocated to the link LinkID3 based on the amount of data to be sent over the link LinkID3 After the station completes communication using the first link, and when the station uses the link LinkID3 for communication, the communication resource determined can be allocated to the link LinkID3 for the station to use to communicate with the access point over the link LinkD3.

In some embodiments, the buffer data information also includes a traffic identifier (TID) corresponding to each link other than the first link.

Different links can have different traffic identifiers, which can represent the business, the data type, the service quality, and other information corresponding to the link. Explanations are provided in the following taking the traffic identifier representing the service quality as an example. For links with different traffic identifiers, the resources allocated by the access point to the links can be different. For example, the resources allocated have different cycles. Embodiments of the present disclosure can carry the traffic identifier of the link other than the first link in the buffer data information and send it to the access point. For example, the buffer data information can be as shown in Table 2:

TABLE 2

| LinkID2 | buffer size2 | TID2 | LinkID3 | buffer size3 | TID3 | . . . |

Based on the buffer data information, the access point can determine that the traffic identifier of the link LinkID2 is TID2. Based on TID2, the service quality required for the data to be sent over the link LinkID2 can be determined to be QoS2, and thus an amount of data to be sent over the link LinkID2 can be determined based on the service quality QoS2 and the buffer size2.

Correspondingly, based on the buffer data information, the access point can determine that the traffic identifier of the link LinkID3 is TID3. Based on TID3, the service quality required for the data to be sent over the link LinkID3 can be determined to be QoS3, and thus an amount of data to be sent over the link LinkID3 can be determined based on the service quality QoS3 and the buffer size3.

Figure 2:
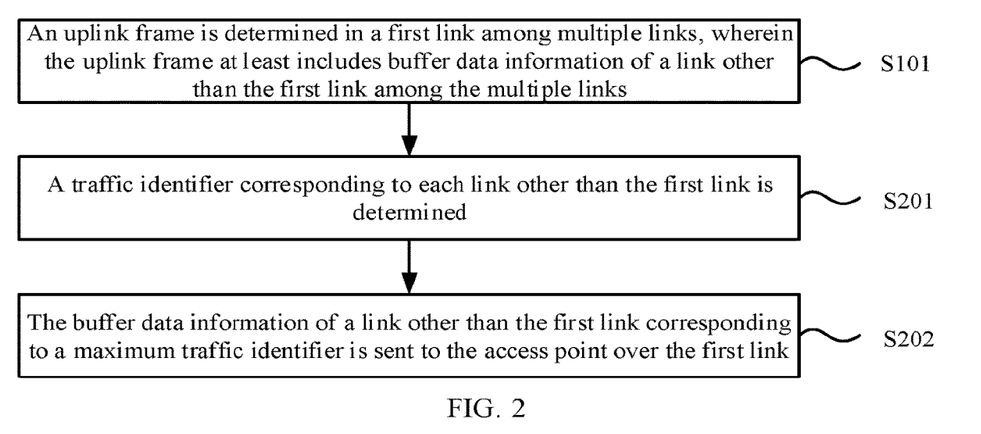
FIG. 2 is a schematic flowchart of a method for sending buffer data information according to embodiments of the present disclosure.

FIG. 2 is a schematic flowchart of a method for sending buffer data information according to embodiments of the present disclosure. As shown in FIG. 2, in some embodiments of the present disclosure, sending the uplink frame to the access point over the first link includes following steps.

In step S201, a traffic identifier corresponding to each link other than the first link is determined.

In step S202, the buffer data information of a link other than the first link corresponding to a maximum traffic identifier is sent to the access point over the first link.

In some embodiments, if the station is unable to send the buffer data information of all other links other than the first link to the access point over the first link, for example, due to insufficient resources or other reasons, the station can send the buffer data information of a link other than the first link corresponding to a maximum traffic identifier to the access point.

The traffic identifier can be associated with the service quality of the data to be sent over the link. Generally speaking, the larger the traffic identifier is, the higher the service quality required for the data to be sent is, and the higher the service quality is, the lower an allowed communication delay is. Therefore, priority can be given to sending the buffer data information of links other than the first link corresponding to larger traffic identifiers, to ensure that the access point can receive the buffer data information preferentially from these links other than the first link, thereby allocating resources to these links in a timely manner, and ensuring that the data to be sent over these links can be sent in a timely manner.

In some embodiments, among traffic identifiers corresponding to all other links, at least one traffic identifier larger than a preset threshold is determined, and then the buffer data information of the link other than the first link corresponding to the at least one traffic identifier determined is sent to the access point.

In some embodiments, a maximum traffic identifier can be determined among the traffic identifiers corresponding to all other links, and then the buffer data information of the link other than the first link corresponding to the maximum traffic identifier can be sent to the access point.

Figure 3:
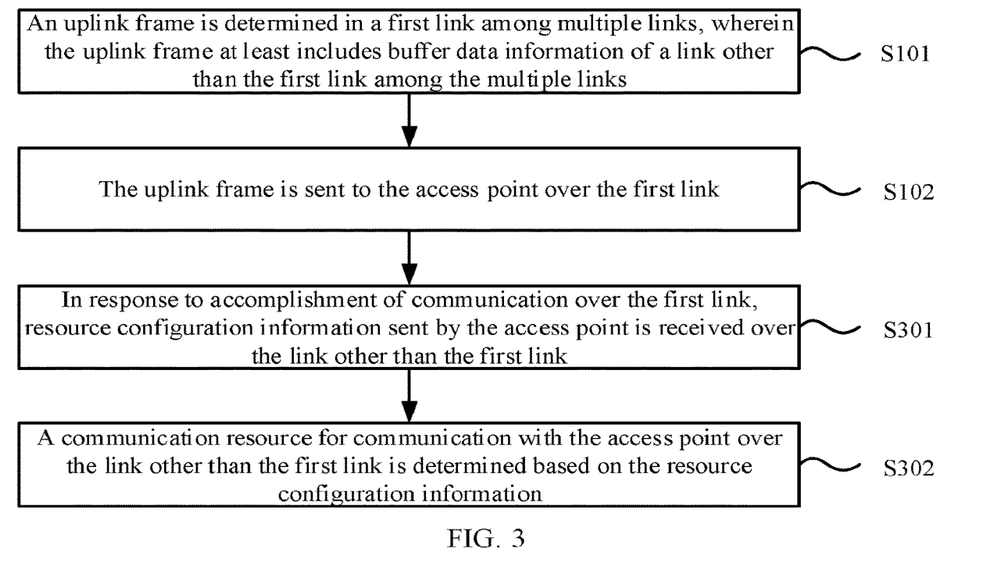
FIG. 3 is a schematic flowchart of a method for sending buffer data information according to embodiments of the present disclosure.

FIG. 3 is a schematic flowchart of a method for sending buffer data information according embodiments of the present disclosure. As shown in FIG. 3, in some embodiments of the present disclosure, the method further includes following steps.

In step S301, in response to completion of communication over the first link, resource configuration information sent by the access point is received over the link other than the first link.

In step S302, a communication resource for communication with the access point over the link other than the first link is determined based on the resource configuration information.

In some embodiments, the station has sent the buffer data information of other links to the access point when the station communicates with the access point over the first link, therefore, the access point can determine the resources allocated to other links based on the buffer data information received before the station completes the communication over the first link, and generate the resource configuration information accordingly.

After the station completes the communication with the access point over the first link, and when the station selects other links to communicate with the access point, the access point can immediately send the resource configuration information determined to the station over other links, so that the station can determine based on the resource configuration information in a timely manner the communication resource for sending information to the access point over other links, and then communicates with the access point on the communication resource determined.

Figure 4:
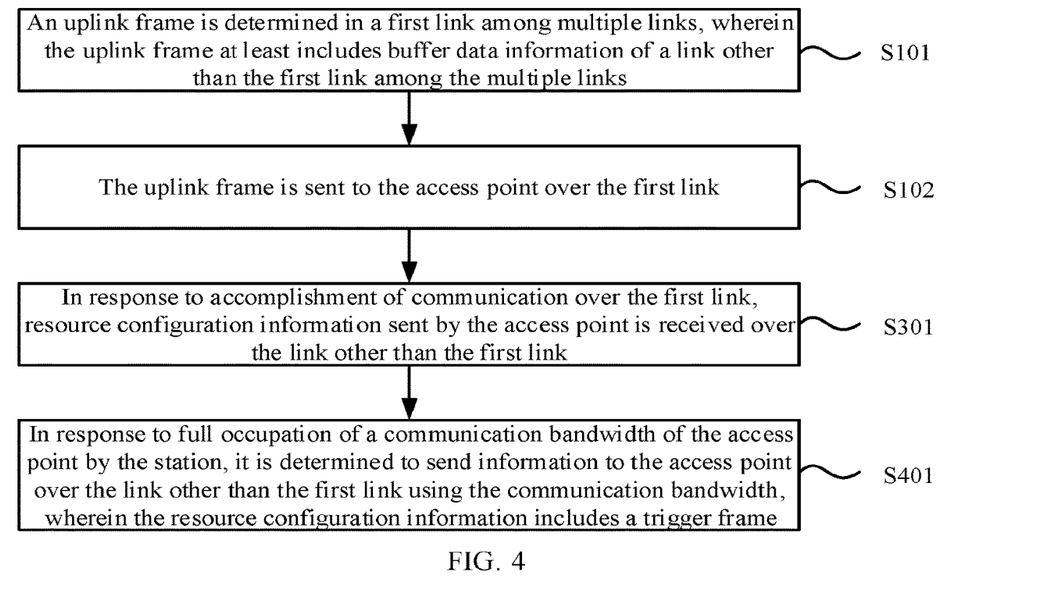
FIG. 4 is a schematic flowchart of a method for sending buffer data information according to embodiments of the present disclosure.

FIG. 4 is a schematic flowchart of a method for sending buffer data information according embodiments of the present disclosure. As shown in FIG. 4, in some embodiments of the present disclosure, determining, based on the resource configuration information, the resource for sending information to the access point over the link other than the first link includes following steps.

In step S401, in response to full occupation of a communication bandwidth of the access point by the station, it is determined to send information to the access point over the link other than the first link using the communication bandwidth, wherein the resource configuration information includes a trigger frame.

In some embodiments, the communication bandwidth of the access point can be fully occupied by the station, that is, the station exclusively occupies the communication bandwidth of the access point. Then all resources on the communication bandwidth of the access point can be arbitrarily used by the station. Therefore, there is no need to configure a specific resource unit (RU) for the station. Instead, a simple trigger frame is sent to instruct the station to send information to the access point on the communication bandwidth. The specific resource unit on the communication bandwidth for sending the information can be determined by the station as needed.

Figure 5:
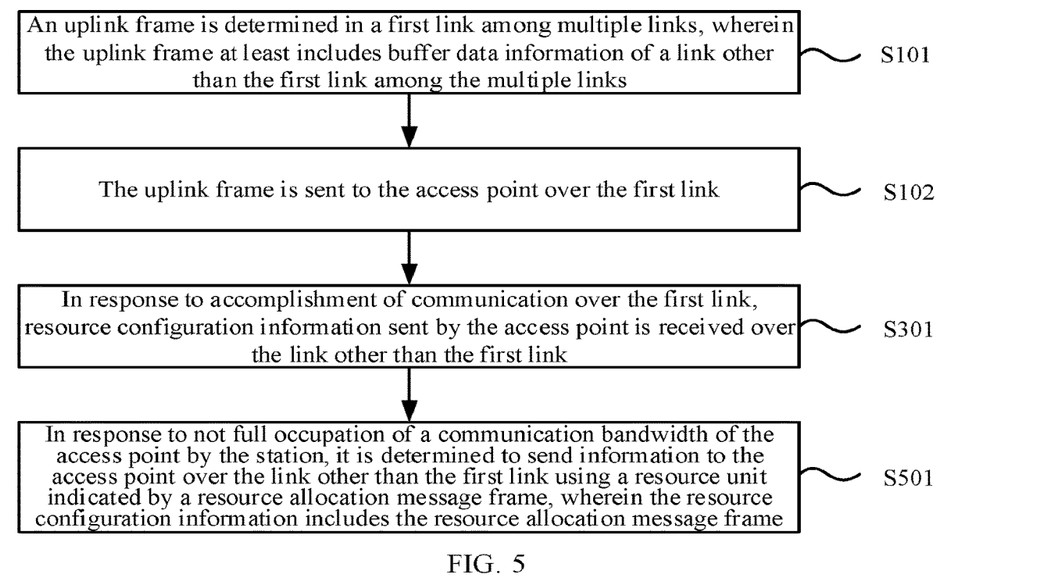
FIG. 5 is a schematic flowchart of a method for sending buffer data information according to embodiments of the present disclosure.

FIG. 5 is a schematic flowchart of a method for sending buffer data information according embodiments of the present disclosure. As shown in FIG. 5, in some embodiments of the present disclosure, determining, based on the resource configuration information, the resource for sending information to the access point over the link other than the first link includes following steps.

In step S501, in response to not full occupation of a communication bandwidth of the access point by the station, it is determined to send information to the access point over the link other than the first link using a resource unit indicated by a resource allocation message frame, wherein the resource configuration information includes the resource allocation message frame.

In some embodiments, when the communication bandwidth of the access point is not fully occupied by the station, the resources on the communication bandwidth of the access point can be freely used by the station. Therefore, the resource allocation message frame can be configured for the station to indicate specific resource unit, and the station can then send information to the access point on the resource unit indicated.

Figure 6:
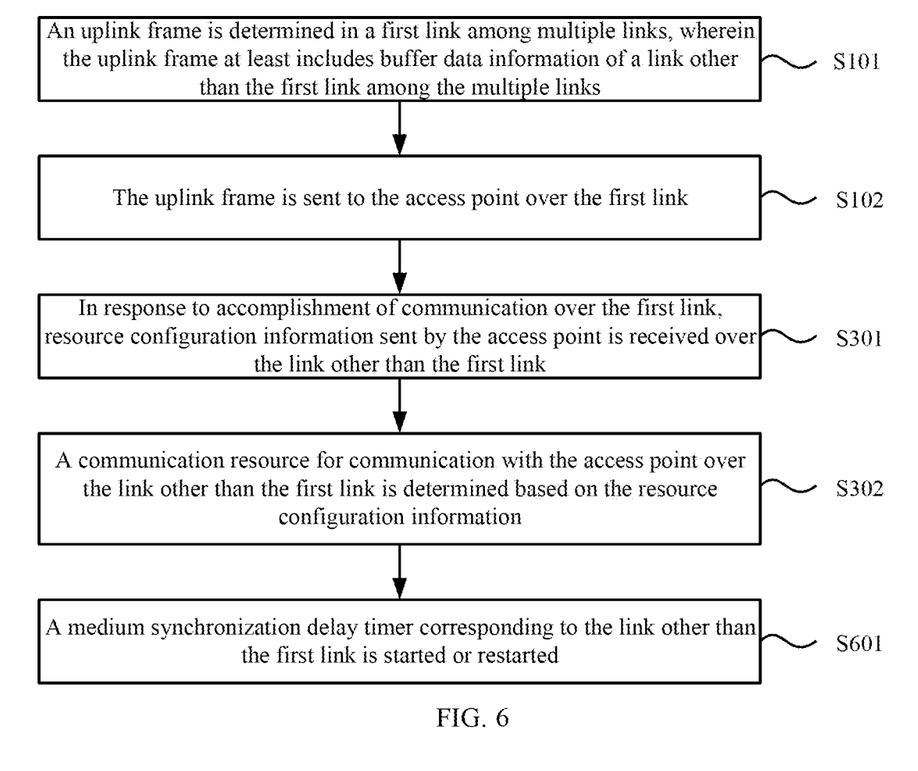
FIG. 6 is a schematic flowchart of a method for sending buffer data information according to embodiments of the present disclosure.

FIG. 6 is a schematic flowchart of a method for sending buffer data information according embodiments of the present disclosure. As shown in FIG. 6, in some embodiments of the present disclosure, the method further includes following steps.

In step S601, a medium synchronization delay timer corresponding to the link other than the first link is started or restarted.

In some embodiments, upon completion of communication over the first link, the medium synchronization delay timer corresponding to the link other than the first link can be started or restarted. In some embodiments, a timer value of the medium synchronization delay timer corresponding to the link other than the first link is set to 0, so as to prepare to awaken other links. After the timer expires, the link other than the first link can be awakened, and then can be used for communication with the access point.

Figure 7:
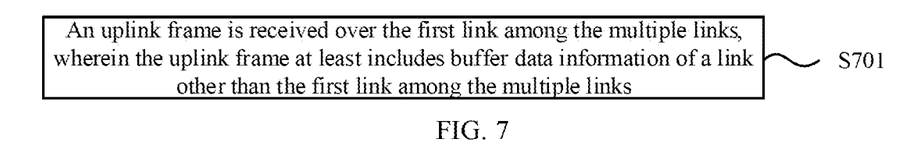
FIG. 7 is a schematic flowchart of a method for receiving buffer data information according to embodiments of the present disclosure.

FIG. 7 is a schematic flowchart of a method for receiving buffer data information according to embodiments of the present disclosure. The method for receiving buffer data information provided in embodiments of the present disclosure can be applied to an access point. The access point can communicate with a station. The station includes but is not limited to electronic devices such as mobile phones, tablets, wearable devices, sensors, IoT (Internet of Things) devices, etc. The access point includes but is not limited to electronic devices such as routers, terminals, etc. In some embodiments, the terminal can be a station applicable to the method for sending buffer data information described in any of above embodiments.

In some embodiments, there are multiple links between the station and the access point, and the station can communicate with the access point through one or more of the multiple links.

As shown in FIG. 7, the method for receiving buffer data information can include the following steps.

In step S701, an uplink frame is received over a first link among the multiple links, wherein the uplink frame at least includes buffer data information of a link other than the first link among the multiple links.

In some embodiments, the station can determine the uplink frame in the first link, for example, the station generates the uplink frame during communication with the access point using the first link.

In some embodiments, the uplink frame can include buffer data information of a link other than the first link among the multiple links, and the uplink frame can then be sent to the access point over the first link, thereby sending the buffer data information of the link other than the first link in the uplink frame to the access point.

According to embodiments, the access point can receive buffer data information of the link other than the first link during communication with the station over the first link, thereby determining, before communicating with the station over the link other than the first link, how much data is to be sent over the link other than the first link based on the buffer data information received, and thus determining communication resources that need to be allocated to the station for communication over the link other than the first link.

In subsequent communication with the station over the link other than the first link, the communication resources determined can be allocated to the station in a timely manner, thereby avoiding the problem of inaccurate configuration of communication resources for the link other than the first link, due to configuration of communication resources before how much data is to be sent over the link other than the first link has not been determined.

In the related technology, only the buffer data information of the first link can be sent to the access point over the first link. According to embodiments of the present disclosure, the buffer data information of the link other than the first link can be sent to the access point over the first link, thereby expanding the functionality of the first link and improving the utilization of the frequency.

In some embodiments, a first link and a link other than the first link are in a non-simultaneously TX and RX state. That is, when the terminal uses the first link to communicate with the access point, the link other than the first link is in a blindness period or in a power save (PS) state, and the station does not use the link other than the first link to communicate with the access point, nor does the link other than the first link be used for channel sensing.

In such case, the station cannot use the link other than the first link to communicate with the access point when using the first link for communication. Therefore, embodiments of the present disclosure can be applied to the first link and the link other than the first link that are in the non-simultaneously TX and RX state.

In some embodiments, embodiments of the present disclosure can also be applicable when the first link and the link other than the first link transition from the non-simultaneously TX and RX state to a simultaneously TX and RX state, that is, from Non-STR to STR. Although it is possible to communicate simultaneously over the first link and the link other than the first link after transition, embodiments of the present disclosure still can be used to send the buffer data information of the link other than the first link over the first link before, during, or after the transition, due to inability to communicate over the link other than the first link during the communication process using the first link before the transition.

In some embodiments, the buffer data information is located in a Medium Access Control (MAC) frame header of the uplink frame, for example, in an A-control field of the MAC frame header.

In some embodiments, the buffer data information includes an identification of each link other than the first link and information corresponding to an amount of data to be sent over each link other than the first link.

By carrying in the buffer data information the identification of the link other than the first link and information corresponding to the amount of data to be sent over the link other than the first link, the access point can determine based on the identification which identification the buffer data information is for, and determine an amount of data to be sent over the link other than the first link based on the information corresponding to the amount of data to be sent over the link other than the first link, thereby configuring appropriate communication resources for the link other than the first link.

For example, a station uses the first link to communicate with the access point and there are at least two links other than the first link, identifications of which are respectively LinkID2 and LinkID3 The information corresponding to the amount of data to be sent over the link LinkD2 is buffer size2, and the information corresponding to the amount of data to be sent over the link LinkID3 is buffer size3. Then the buffer data information can be as shown in Table 1.

Based on the buffer data information, the access point can determine that the information corresponding to the amount of data to be sent over the link LinkD2 is buffer size2, thereby determining an amount of data to be sent over the link LinkD2 based on buffer size2, and thus determining a communication resource allocated to the link LinkID2 based on the amount of data to be sent over the link LinkID2 After the station completes communication using the first link, and when the station uses the link LinkID2 for communication, the communication resource determined can be allocated to the link LinkID2 for the station to use to communicate with the access point over the link LinkID2.

Correspondingly, based on the buffer data information, the access point can also determine that the information corresponding to the amount of data to be sent over the link LinkID3 is buffer size3, thereby determining an amount of data to be sent over the link LinkD3 based on buffer size3, and thus determining a communication resource allocated to the link LinkID3 based on the amount of data to be sent over the link LinkID3 After the station completes communication using the first link, and when the station uses the link LinkID3 for communication, the communication resource determined can be allocated to the link LinkID3 for the station to use to communicate with the access point over the link LinkID3.

In some embodiments, the buffer data information also includes a traffic identifier (TID) corresponding to the link other than the first link. Different links can have different traffic identifiers, which can represent the business, the data type, the service quality, and other information corresponding to the link. Explanations are provided in the following taking the traffic identifier representing the service quality as an example. For links with different traffic identifiers, the resources allocated by the access point to the links can be different. For example, the resources allocated have different cycles. Embodiments of the present disclosure can carry the traffic identifier of the link other than the first link in the buffer data information and send it to the access point. For example, the buffer data information can be as shown in Table 2.

Based on the buffer data information, the access point can determine that the traffic identifier of the link LinkID2 is TID2. Based on TID2, the service quality required for the data to be sent over the link LinkID2 can be determined to be QoS2, and thus an amount of data to be sent over the link LinkID2 can be determined based on the service quality QoS2 and the buffer size2.

Correspondingly, based on the buffer data information, the access point can determine that the traffic identifier of the link LinkID3 is TID3. Based on TID3, the service quality required for the data to be sent over the link LinkID3 can be determined to be QoS3, and thus an amount of data to be sent over the link LinkID3 can be determined based on the service quality QoS3 and the buffer size3.

Figure 8:
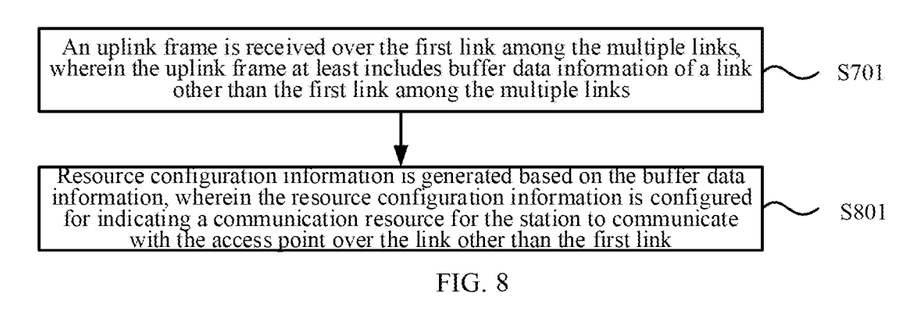
FIG. 8 is a schematic flowchart of a method for receiving buffer data information according to embodiments of the present disclosure.

FIG. 8 is a schematic flowchart of a method for receiving buffer data information according to embodiments of the present disclosure. As shown in FIG. 8, the method further includes following steps.

In step S801, resource configuration information is generated based on the buffer data information, wherein the resource configuration information is configured for indicating a communication resource for the station to communicate with the access point over the link other than the first link.

In some embodiments, the access point can determine based on buffer data information how much data is to be sent on over the link other than the first link, and then determines communication resources that need to be allocated to the station for communication over the link other than the first link. The resource configuration information can be generated based on the communication resource determined, which can then be sent to the station.

In some embodiments, the resource configuration information can be sent to the station over the first link, or the resource configuration information can be sent to the station over the link other than the first link.

Figure 9:
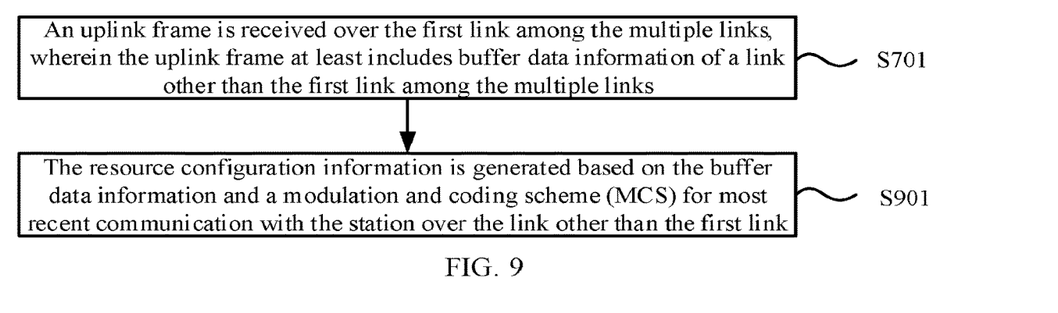
FIG. 9 is a schematic flowchart of a method for receiving buffer data information according to embodiments of the present disclosure.

FIG. 9 is a schematic flowchart of a method for receiving buffer data information according to embodiments of the present disclosure. As shown in FIG. 9, generating resource configuration information based on the buffer data information includes following steps.

In step S901, the resource configuration information is generated based on the buffer data information and a modulation and coding scheme (MCS) for most recent communication with the station over the link other than the first link.

In some embodiments, after receiving the buffer data information of the link other than the first link, the access point can query the modulation and coding scheme adopted in the most recent communication with the station over the link other than the first link. The modulation and coding scheme can affect the communication rate, and the modulation and coding scheme adopted in next communication between the access point and the station over the link other than the first link, has a high probability of being the same as the modulation and coding scheme adopted in the most recent communication. Therefore, communication resources can be configured for the link other than the first link not only based on buffer data information, but also based on the modulation and coding scheme.

For example, for two other links Link1 and Link2 with the same amount of data to be sent, the modulation and coding scheme used for the most recent communication between the access point and the station over Link1 is MCS1, and the modulation and coding scheme used for the most recent communication between the access point and the station over Link2 is MCS2. If MCS1 corresponds to a higher communication rate and MCS2 corresponds to a lower communication rate, then fewer communication resources can be allocated to Link1, and more communication resources can be allocated to Link2.

Figure 10:
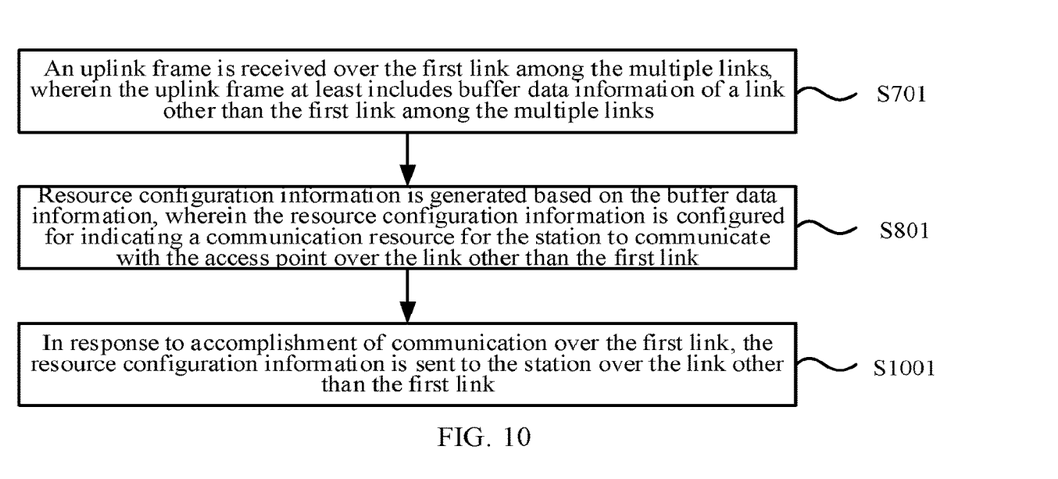
FIG. 10 is a schematic flowchart of a method for receiving buffer data information according to embodiments of the present disclosure.

FIG. 10 is a schematic flowchart of a method for receiving buffer data information according to embodiments of the present disclosure. As shown in FIG. 10, the method further includes following steps.

In step S1001, in response to completion of communication over the first link, the resource configuration information is sent to the station over the link other than the first link.

In some embodiments, the station has sent the buffer data information of other links to the access point when the station communicates with the access point over the first link, therefore, the access point can determine the resources allocated to other links based on the buffer data information received before the station completes the communication over the first link, and generate the resource configuration information accordingly.

After the station completes the communication with the access point over the first link, and when the station selects other links to communicate with the access point, the access point can immediately send the resource configuration information determined to the station over other links, so that the station can determine based on the resource configuration information in a timely manner the communication resource for sending information to the access point over other links, and then communicates with the access point on the communication resource determined.

In some embodiments, when a communication bandwidth of the access point is fully occupied by the station, the resource configuration information includes a trigger frame, which is configured for instructing the station to send information to the access point over the link other than the first link using the communication bandwidth.

In some embodiments, the communication bandwidth of the access point can be fully occupied by the station, that is, the station exclusively occupies the communication bandwidth of the access point. Then all resources on the communication bandwidth of the access point can be arbitrarily used by the station. Therefore, there is no need to configure a specific resource unit (RU) for the station. Instead, a simple trigger frame is sent to instruct the station to send information to the access point on the communication bandwidth. The specific resource unit on the communication bandwidth for sending the information can be determined by the station as needed.

In some embodiments, when the communication bandwidth of the access point is not fully occupied by the station, the resource configuration information includes a resource allocation message frame, which is configured for instructing the station to send information to the access point over the link other than the first link using a resource unit indicated by the resource allocation message frame.

In some embodiments, when the communication bandwidth of the access point is not fully occupied by the station, the resources on the communication bandwidth of the access point can be freely used by the station. Therefore, the resource allocation message frame can be configured for the station to indicate specific resource unit, and the station can then send information to the access point on the resource unit indicated.

Embodiments of the present disclosure also provide an apparatus for sending buffer data information and an apparatus for receiving buffer data information, corresponding to embodiments of the method for sending buffer data information and the method for receiving buffer data information mentioned above.

Figure 11:
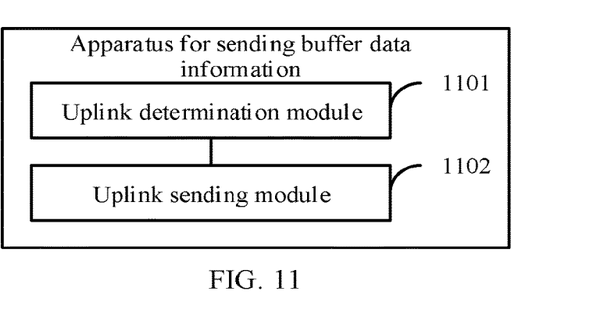
FIG. 11 is a schematic block diagram of an apparatus for sending buffer data information according to embodiments of the present disclosure.

FIG. 11 is a schematic block diagram of an apparatus for sending buffer data information according to embodiments of the present disclosure. The apparatus for sending buffer data information in embodiments of the present disclosure can be applied to a station. The station includes but is not limited to electronic devices such as mobile phones, tablets, wearable devices, sensors, IoT (Internet of Things) devices, etc. The station can communicate with an access point. The access point includes but is not limited to electronic devices such as routers, terminals, etc. In some embodiments, the access point can be an access point applicable to the apparatus for receiving buffer data information described in any subsequent embodiment.

In some embodiments, there are multiple links between the station and the access point, and the station can communicate with the access point through one or more of the multiple links.

As shown in FIG. 11, the apparatus for sending buffer data information can include an uplink determination module 1101 and an uplink sending module 1102.

The uplink determination module 1101 is configured to determine an uplink frame in a first link among the multiple links, wherein the uplink frame at least includes buffer data information of a link other than the first link among the multiple links.

The uplink sending module 1102 is configured to send the uplink frame to the access point over the first link.

In some embodiments, the buffer data information includes an identification of each link other than the first link and information corresponding to an amount of data to be sent over each link other than the first link.

In some embodiments, the buffer data information also includes a traffic identifier (TID) corresponding to each link other than the first link.

In some embodiments, the uplink sending module is configured to determine a traffic identifier corresponding to each link other than the first link, and send over the first link the buffer data information of a link other than the first link corresponding to a maximum traffic identifier to the access point.

Figure 12:
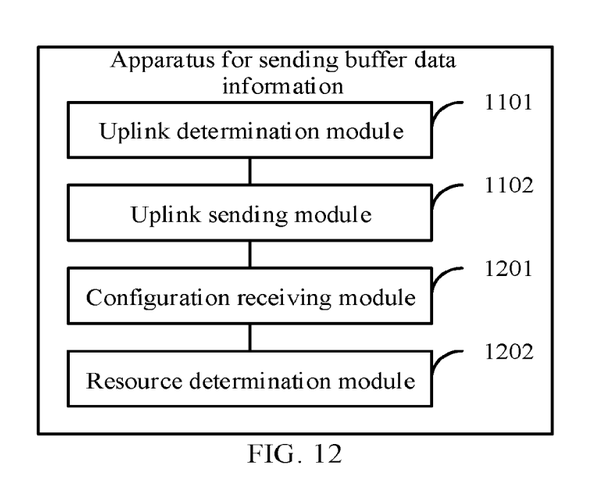
FIG. 12 is a schematic block diagram of an apparatus for sending buffer data information according to embodiments of the present disclosure.

FIG. 12 is a schematic block diagram of an apparatus for sending buffer data information according to embodiments of the present disclosure. As shown in FIG. 12, in some embodiments, the apparatus further includes a configuration receiving module 1201 and a resource determination module 1202.

The configuration receiving module 1201 is configured to receive over the link other than the first link, in response to completion of communication over the first link, resource configuration information sent by the access point.

The resource determination module 1202 is configured to determine, based on the resource configuration information, a communication resource for communication with the access point over the link other than the first link.

In some embodiments, the resource determination module is configured to determine, in response to full occupation of a communication bandwidth of the access point by the station, to send information to the access point over the link other than the first link using the communication bandwidth, wherein the resource configuration information includes a trigger frame.

In some embodiments, the resource determination module is configured to determine, in response to not full occupation of a communication bandwidth of the access point by the station, to send information to the access point over the link other than the first link using a resource unit indicated by a resource allocation message frame, wherein the resource configuration information includes the resource allocation message frame.

Figure 13:
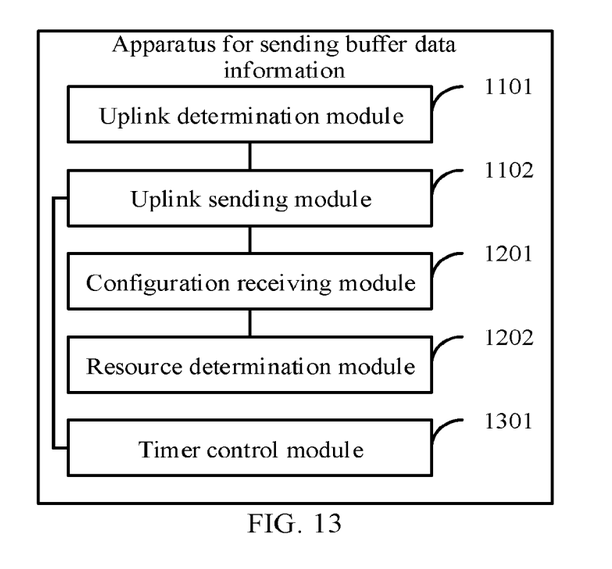
FIG. 13 is a schematic block diagram of an apparatus for sending buffer data information according to embodiments of the present disclosure.

FIG. 13 is a schematic block diagram of an apparatus for sending buffer data information according to embodiments of the present disclosure. As shown in FIG. 13, in some embodiments, the device further includes a timer control module 1301.

The timer control module 1301 is configured to start or restart a medium synchronization delay timer corresponding to the link other than the first link.

In some embodiments, the first link and the link other than the first link are in a non-simultaneously transmit (TX) and receive (RX) state.

In some embodiments, the buffer data information is located in a Medium Access Control (MAC) frame header of the uplink frame.

Figure 14:
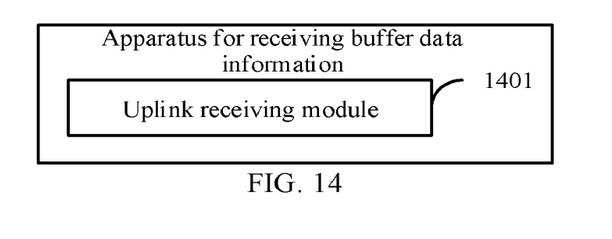
FIG. 14 is a schematic block diagram of an apparatus for receiving buffer data information according to embodiments of the present disclosure.

FIG. 14 is a schematic block diagram of an apparatus for receiving buffer data information according to embodiments of the present disclosure. The an apparatus for receiving buffer data information in embodiments of the present disclosure can be applied to an access point. The access point can communicate with a station. The station includes but is not limited to electronic devices such as mobile phones, tablets, wearable devices, sensors, IoT (Internet of Things) devices, etc. The access point includes but is not limited to electronic devices such as routers, terminals, etc. In some embodiments, the terminal can be a station applicable to the method for sending buffer data information described in any of above embodiments.

In some embodiments, there are multiple links between the station and the access point, and the station can communicate with the access point through one or more of the multiple links.

As shown in FIG. 14, the apparatus for receiving buffer data information can include a uplink receiving module 1401. The uplink receiving module 1401 is configured to receive an uplink frame over a first link among the multiple links, wherein the uplink frame at least includes buffer data information of a link other than the first link among the multiple links.

In some embodiments, the buffer data information includes an identification of each link other than the first link and information corresponding to an amount of data to be sent over each link other than the first link.

In some embodiments, the buffer data information further includes a traffic identifier corresponding to each link other than the first link.

Figure 15:
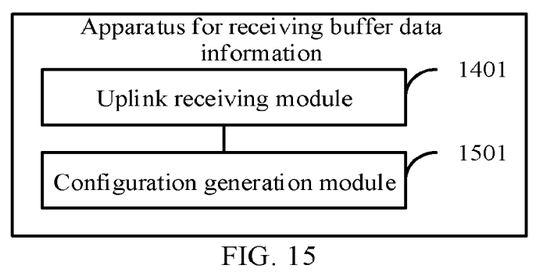
FIG. 15 is a schematic block diagram of an apparatus for receiving buffer data information according to embodiments of the present disclosure.

FIG. 15 is a schematic block diagram of an apparatus for receiving buffer data information according to embodiments of the present disclosure. As shown in FIG. 15, in some embodiments, the apparatus further includes a configuration generation module 1501.

The configuration generation module 1501 is configured to generate resource configuration information based on the buffer data information, wherein the resource configuration information is configured for indicating a communication resource for the station to communicate with the access point over the link other than the first link.

In some embodiments, the configuration generation module is configured to generate the resource configuration information based on the buffer data information and a modulation and coding scheme (MCS) for most recent communication with the station over the link other than the first link.

Figure 16:
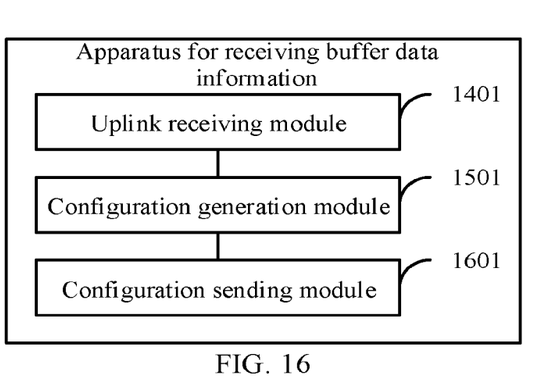
FIG. 16 is a schematic block diagram of an apparatus for receiving buffer data information according to embodiments of the present disclosure.

FIG. 16 is a schematic block diagram of an apparatus for receiving buffer data information according to embodiments of the present disclosure. As shown in FIG. 16, in some embodiments, the apparatus further includes a configuration sending module 1601.

The configuration sending module 1601 is configured to send over the link other than the first link, in response to completion of communication over the first link, the resource configuration information to the station.

In some embodiments, when the communication bandwidth of the access point is fully occupied by the station, the resource configuration information includes a trigger frame, which is configured for instructing the station to send information to the access point over the link other than the first link using the communication bandwidth.

In some embodiments, when the communication bandwidth of the access point is not fully occupied by the station, the resource configuration information includes a resource allocation message frame, which is configured for instructing the station to send information to the access point over the link other than the first link using a resource unit indicated by the resource allocation message frame.

In some embodiments, the first link and the link other than the first link are in a non-simultaneously transmit (TX) and receive (RX) state.

In some embodiments, the buffer data information is located in a Medium Access Control (MAC) frame header of the uplink frame.

Regarding the device in the above embodiment, the specific ways in which each module performs operations have been described in detail in the relevant method embodiments, and will not be elaborated here.

Apparatus embodiments basically correspond to method embodiments, relevant information can be obtained by referring to description of method embodiments. Apparatus embodiments described above are only schematic, and modules described as separate components can be or cannot be physically separated, and the components shown as modules can be or cannot be physical modules, which can be located in one place or distributed across multiple network modules. Some or all modules can be selected according to actual needs to achieve the purpose of embodiments of the present disclosure. Those of ordinary skill in the art can understand and implement the present disclosure without creative efforts.

Embodiments of the present disclosure also provide an electronic device. The electronic device includes a processor, and a memory for storing instructions executable by the processor.

In some embodiments, the processor is configured to implement the method for sending buffer data information described in any of above embodiments, and/or the method for receiving buffer data information described in any of above embodiments.

Embodiments of the present disclosure also provide a computer-readable storage medium on which a computer program is stored. When the program is executed by a processor, the method for sending buffer data information as described in any of above embodiments and/or the method for receiving buffer data information as described in any of above embodiments are implemented.

Figure 17:
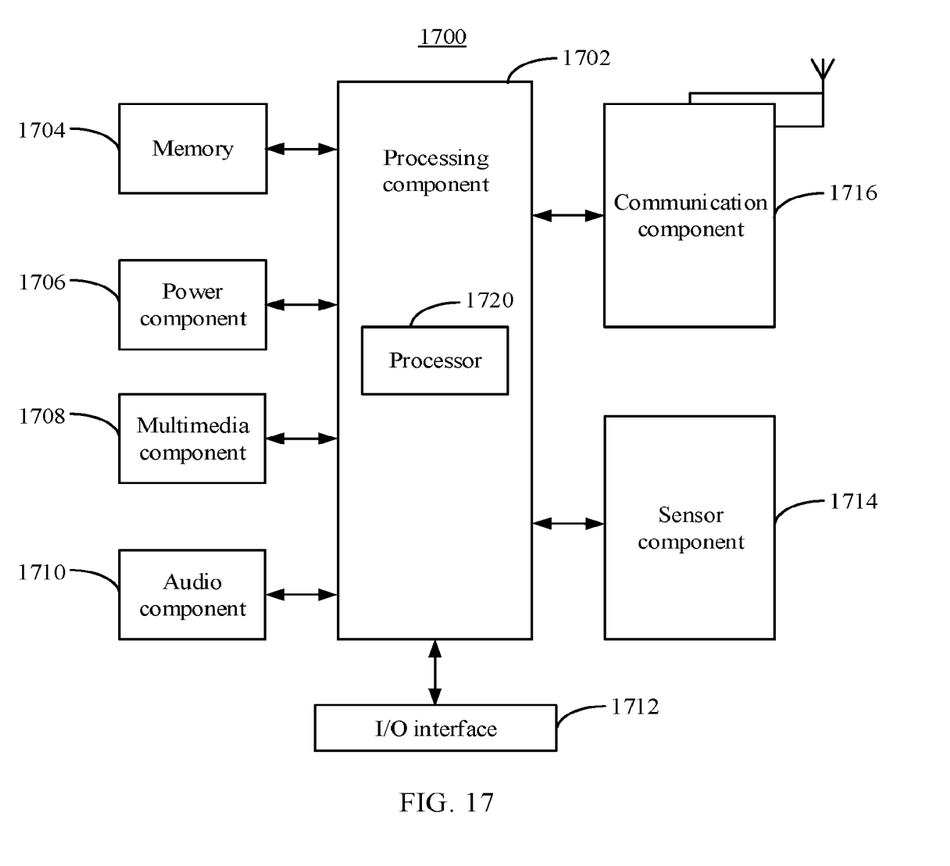
FIG. 17 is a schematic block diagram of a device for sending and/or receiving buffer data information according to embodiments of the present disclosure.

FIG. 17 is a schematic block diagram of a device 1700 for sending and/or receiving buffer data information according to embodiments of the present disclosure. For example, device 1700 can be a mobile phone, a computer, a digital broadcasting user device, a messaging device, a game console, a tablet device, a medical device, a fitness device, a personal digital assistant, etc.

Referring to FIG. 17, the device 1700 can include at least one of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls the overall operation of the device 1700, such as operations associated with display, telephone call, data communication, camera operation, and recording operations. The processing component 1702 may include one or more processors to execute instructions to complete all or part of the methods described above. In addition, the processing component 1702 may include one or more modules to facilitate interactions between the processing component 1702 and other components. For example, the processing component 1702 may include a multimedia module to facilitate interaction between the multimedia component 1708 and the processing component 1702.

The memory 1704 is configured to store various types of data to support operations in the device 1700. Examples of such data include instructions, contact data, phone book data, messages, pictures, videos, and the like for any application or method operating on the device 1700. The memory 1704 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 1706 provides power for various components of the device 1700. The power component 1706 may include a power management system, one or more power supplies, and other components associated with generating, managing, and distributing power for the device 1700.

The multimedia component 1708 includes a display screen providing an output interface between the device 1700 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 1708 includes a front camera and/or a rear camera. When the device 1700 is in operation mode, such as shooting mode or video mode, the front camera and/or rear camera can receive external multimedia data. Each front camera and rear camera can be a fixed optical lens system or have focal length and optical zoom capability.

The audio component 1710 is configured to output and/or input audio signals. For example, the audio component 1710 includes a microphone (MIC), which is configured to receive an external audio signal when the device 1700 is in an operation mode, such as a calling mode, a recording mode, and a voice recognition mode. The received audio signal may be further stored in memory 1704 or transmitted via communication component 1716. In some embodiments, the audio component 1710 also includes a speaker for outputting audio signals.

The I/O interface 1712 provides an interface between the processing component 1702 and peripheral interface modules, which can be a keyboard, click wheel, button, etc. These buttons may include, but are not limited to, the Home button, Volume button, Start button, and Lock button.

The sensor component 1714 includes one or more sensors for providing various aspects of condition evaluation for the device 1700. For example, the sensor component 1714 can detect an open/closed state of the device 1700, relative positioning of the components. The component is, for example, a display and a keypad of the device 1700. The sensor component 1714 can also detect changes in the position of the device 1700 or one component of the device 1700, presence or absence of the user's contact with the device 1700, orientation or acceleration/deceleration of the device 1700 and temperature change of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an acceleration sensor, a gyroscope sensor, a magnetic sensor, a pressure sensor, or a temperature sensor.

The communication component 1716 is configured to facilitate wired or wireless communication between the device 1700 and other devices. The device 1700 can access wireless networks based on any communication standard, such as WiFi, 2G or 3G, or a combination thereof. In some embodiments, the communication component 1716 receives a broadcast signal or broadcast related information from an external broadcast management system via a broadcast channel. In some embodiments, the communication component 1716 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In some embodiments, the device 1700 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods.

In some embodiments, a non-transitory computer-readable storage medium including instructions is also provided, such as a memory 1704 including instructions, which can be executed by a processor of the device 1700 to complete above methods. For example, the non-transitory computer-readable storage medium can be ROM, random access memory (RAM), CD-ROM, tapes, floppy disks, optical data storage devices, etc.

After considering the specification and practices of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that the present disclosure is not limited to the precise structure described above and shown in the drawings, and various modifications and changes can be made without departing from its scope. The scope of the present disclosure is limited only by the appended claims.

It should be noted that in the present disclosure, relational terms such as first and second are only used to distinguish one entity or operation from another entity or operation, and do not necessarily require or imply any actual relationship or order between these entities or operations. The terms "include", "comprise", or any other variation thereof are intended to encompass non-exclusive inclusion, such that a process, method, item, or device that includes a series of elements not only includes those elements, but also other elements that are not explicitly listed, or also include elements inherent in such process, method, item, or device. Without further limitations, the elements limited by the statement "including one . . . " do not exclude the existence of other identical elements in the process, method, item, or device that includes said elements.

The above provides a detailed introduction to the methods and devices provided by embodiments of the present disclosure. Specific examples are applied to explain the principles and implementation methods of the present disclosure. The explanations of above embodiments are only used to help to understand the methods and core ideas of the present disclosure. For those skilled in the art, there may be changes in the specific implementation methods and application scope based on the ideas of the present disclosure. In summary, the content of this specification should not be understood as a limitation of the present disclosure.

What is claimed is:

1. A method for sending buffer data information, performed by a station having multiple links with an access point, comprising:
   determining an uplink frame in a first link among the multiple links, wherein the uplink frame at least comprises buffer data information of a link other than the first link among the multiple links; and
   sending the uplink frame to the access point over the first link;
   wherein the buffer data information comprises a traffic identifier corresponding to each link other than the first link, and sending the uplink frame to the access point over the first link comprises:
   determining the traffic identifier corresponding to each link other than the first link; and
   sending over the first link the buffer data information of a link other than the first link corresponding to a maximum traffic identifier to the access point, wherein data to be sent over the link other than the first link corresponding to the maximum traffic identifier requires for the highest service quality.

2. The method according to claim 1, wherein the buffer data information further comprises an identification of each link other than the first link and information corresponding to an amount of data to be sent over each link other than the first link.

3. The method according to claim 1, further comprising:
   receiving over the link other than the first link, in response to completion of communication over the first link, resource configuration information sent by the access point; and determining, based on the resource configuration information, a communication resource for communication with the access point over the link other than the first link.

4. The method according to claim 3, wherein determining, based on the resource configuration information, a communication resource for communication with the access point over the link other than the first link comprises:
determining, in response to full occupation of a communication bandwidth of the access point by the station, to send information to the access point over the link other than the first link using the communication bandwidth, wherein the resource configuration information comprises a trigger frame.

5. The method according to claim 3, wherein determining, based on the resource configuration information, a communication resource for communication with the access point over the link other than the first link comprises:
determining, in response to not full occupation of a communication bandwidth of the access point by the station, to send information to the access point over the link other than the first link using a resource unit indicated by a resource allocation message frame, wherein the resource configuration information comprises the resource allocation message frame.

6. The method according to claim 3, further comprising:
starting or restarting a medium synchronization delay timer corresponding to the link other than the first link.

7. A non-transitory computer-readable storage medium having computer programs stored thereon, which when executed by a processor, cause the method for sending buffer data information according to claim 1 to be implemented.

8. A method for receiving buffer data information, performed by an access point having multiple links with a station, comprising:
receiving an uplink frame over a first link among the multiple links, wherein the uplink frame at least comprises buffer data information of a link other than the first link among the multiple links;
wherein the buffer data information comprises a traffic identifier corresponding to each link other than the first link, and the method further comprises:
generating resource configuration information preferentially for a link other than the first link corresponding to a maximum traffic identifier, wherein data to be sent over the link other than the first link corresponding to the maximum traffic identifier requires for the highest service quality.

9. The method according to claim 8, wherein the buffer data information further comprises an identification of each link other than the first link and information corresponding to an amount of data to be sent over each link other than the first link.

10. The method according to claim 8, wherein generating the resource configuration information comprises:
generating the resource configuration information based on the buffer data information, wherein the resource configuration information is configured for indicating a communication resource for the station to communicate with the access point over the link other than the first link.

11. The method according to claim 10, wherein generating the resource configuration information based on the buffer data information comprises:
generating the resource configuration information based on the buffer data information and a modulation and coding scheme (MCS) for most recent communication with the station over the link other than the first link.

12. The method according to claim 10, further comprising:
sending over the link other than the first link, in response to completion of communication over the first link, the resource configuration information to the station.

13. The method according to claim 12, wherein the resource configuration information comprises a trigger frame, and wherein the trigger frame is configured for instructing, in response to full occupation of a communication bandwidth of the access point by the station, the station to send information to the access point over the link other than the first link using the communication bandwidth.

14. The method according to claim 12, wherein the resource configuration information comprises a resource allocation message frame, and wherein the resource allocation message frame is configured for instructing, in response to not full occupation of a communication bandwidth of the access point by the station, the station to send information to the access point over the link other than the first link using a resource unit indicated by the resource allocation message frame.

15. A communication device, comprising:
a processor; and
a memory for storing instructions executable by the processor;
wherein the processor is configured to perform the method of claim 8.

16. A non-transitory computer-readable storage medium having computer programs stored thereon, which when executed by a processor, cause the method for receiving buffer data information according to claim 8 to be implemented.

17. An electronic device, comprising:
a processor; and
a memory for storing instructions executable by the processor;
wherein the processor is configured to:
determine an uplink frame in a first link among multiple links, wherein the uplink frame at least comprises buffer data information of a link other than the first link among the multiple links; and
send the uplink frame to an access point over the first link;
wherein the buffer data information comprises a traffic identifier corresponding to each link other than the first link, and the processor is further configured to:
determine the traffic identifier corresponding to each link other than the first link; and
send over the first link the buffer data information of a link other than the first link corresponding to a maximum traffic identifier to the access point, wherein data to be sent over the link other than the first link corresponding to the maximum traffic identifier requires for the highest service quality.

* * * * *